US011947539B2

(12) United States Patent
Trigonakis et al.

(10) Patent No.: US 11,947,539 B2
(45) Date of Patent: Apr. 2, 2024

(54) CONCURRENCY AND CANCELLATION IN DISTRIBUTED ASYNCHRONOUS GRAPH PROCESSING

(71) Applicant: ORACLE INTERNATIONAL CORPORATION, Redwood Shores, CA (US)

(72) Inventors: Vasileios Trigonakis, Zurich (CH); Calin Iorgulescu, Zurich (CH); Tomas Faltin, Prague (CZ); Sungpack Hong, Palo Alto, CA (US); Hassan Chafi, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 75 days.

(21) Appl. No.: 17/750,339

(22) Filed: May 21, 2022

(65) Prior Publication Data
US 2023/0376486 A1 Nov. 23, 2023

(51) Int. Cl.
*G06F 16/00* (2019.01)
*G06F 9/48* (2006.01)
*G06F 16/2453* (2019.01)
*G06F 16/27* (2019.01)
*G06F 16/901* (2019.01)

(52) U.S. Cl.
CPC ...... *G06F 16/24542* (2019.01); *G06F 9/4881* (2013.01); *G06F 16/27* (2019.01); *G06F 16/9024* (2019.01)

(58) Field of Classification Search
CPC .. G06F 16/24542; G06F 9/4881; G06F 16/27; G06F 16/9024
See application file for complete search history.

(56) References Cited

U.S. PATENT DOCUMENTS

| 10,241,965 B1* | 3/2019 | Caudy | G06F 16/9024 |
| 10,769,153 B2* | 9/2020 | Hosoya | G06F 16/9024 |
| 11,372,871 B1* | 6/2022 | Tracey | G06F 11/3006 |
| 2016/0378837 A1* | 12/2016 | Desai | G06F 16/2471 |
| | | | 707/727 |
| 2021/0240705 A1 | 8/2021 | Trigonakis | |

OTHER PUBLICATIONS

Fard et al., "A Distributed Vertex-Centric Approach for Pattern Matching in Massive Graphs", 2013, IEEE,pp. 403-411 (Year: 2013).*

(Continued)

*Primary Examiner* — Alexander Khong
(74) *Attorney, Agent, or Firm* — Hickman Becker Bingham Ledesma LLP

(57) ABSTRACT

Techniques to efficiently assign available workers to executing multiple graph queries concurrently on a distributed graph database are disclosed. The techniques comprise a runtime engine assigning multiple workers to executing portions of multiple graph queries, each worker in each assignment asynchronously executing a portion of a graph query within a parallel-while construct that includes return statements at different locations, and the runtime engine reassigning a worker to executing another portion of the same or a different graph query to optimize the overall performance of all workers.

20 Claims, 6 Drawing Sheets

(56) References Cited

OTHER PUBLICATIONS

Bernstein et al.,"Query Processing in a System", Dec. 1981,ACM,pp. 602-625,pp. 602-625 (Year: 1981).*
Trigonakis et al, "aDFS: An Almost Depth-First-Search Distributed Graph-Querying System", in the Proceedings of the 2021 USENIX Annual Technical Conference, dated Jul. 2021, 17 pages.
Roth et al., "PGX.D/Async: A Scalable Distributed Graph Pattern Matching Engine", Grades@SIGMOD/PODS, dated 2017, 6 pages.
OpenMP.org, "OpenMP", https://www.openmp.org/, retrieved May 24, 2022, 5 pages.
Intel.com, "Threading Building Blocks", https://www.intel.com/content/www/us/en/developer/tools/oneapi/onetbb.html#gs.18p5oh, retrieved May 25, 2022, 5 pages.
Intel.com, "TBB Parallel-Do Function", https://www.intel.com/content/www/us/en/develop/documentation/tbb-tutorial/top/tutorial-developing-applications-using-parallelfor/develop-an-application-using-parallelfor.html, dated Sep. 11, 2018, 6 pages.
Harris et al., "Callisto-RTS: Fine-Grain Parallel Loops", Proceedings of the 2015 USENIX Annual Technical Conference, dated Jul. 2015, 13 pages.

* cited by examiner

FIG. 2

```
parallel_while<tls_t>(
    [&](tls_t &tls) { /* initialize tls */ },
    [&](tls_t &tls) { return !is_query_finished(); }, 202
    [&](tls_t &tls, const yield_flag &yield_flag) {
        vertex_iterator it;
        while (vertex_iterator_distributor.try_fetch_next(it)) { //
            for (; it++; it != it.end()) {
                apply_bootstrap(tls, it.vertex());
            } 206
            if (yield_flag.is_set()) {
                return {tls.has_incomplete_computations(), tls.calculate_utilization()};
            } 208
        } 204
        tls.reset_utilization();
        while (!is_query_finished()) {
            receive_messages_and_perform_computations(tls); 212
            if (yield_flag.is_set()) { // enables cancellation & changing the number of
threads during runtime
                return {tls.has_incomplete_computations(), tls.calculate_utilization()};
            } 214
        } 210
    },
    [&](tls_t &tls) { /* finalize tls */ }
);
```

CONCURRENCY AND CANCELLATION IN DISTRIBUTED ASYNCHRONOUS GRAPH PROCESSING

FIELD OF THE INVENTION

The techniques and approaches described herein, relate to the field of database query execution, particularly concurrent, asynchronous execution of multiple graph queries on distributed graph databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

It is challenging to execute graph queries efficiently, and even more so on a distributed graph database. Such execution often involves performing a large number of matches with edges of the graph data and storing a similarly large number of intermediate results. Furthermore, the extensive graph traversal leads to highly irregular access patterns with limited locality.

Utilizing multiple workers to execute graph queries on a distributed graph database can increase the throughput. It would be helpful to have more control over how each worker contributes to such execution to further increase the throughput.

BRIEF DESCRIPTION OF THE DRAWINGS

In the drawings of certain embodiments in which like reference numerals refer to corresponding parts throughout the figures:

FIG. 2 illustrates an example parallel-while construct.

DETAILED DESCRIPTION

Figure 1A:
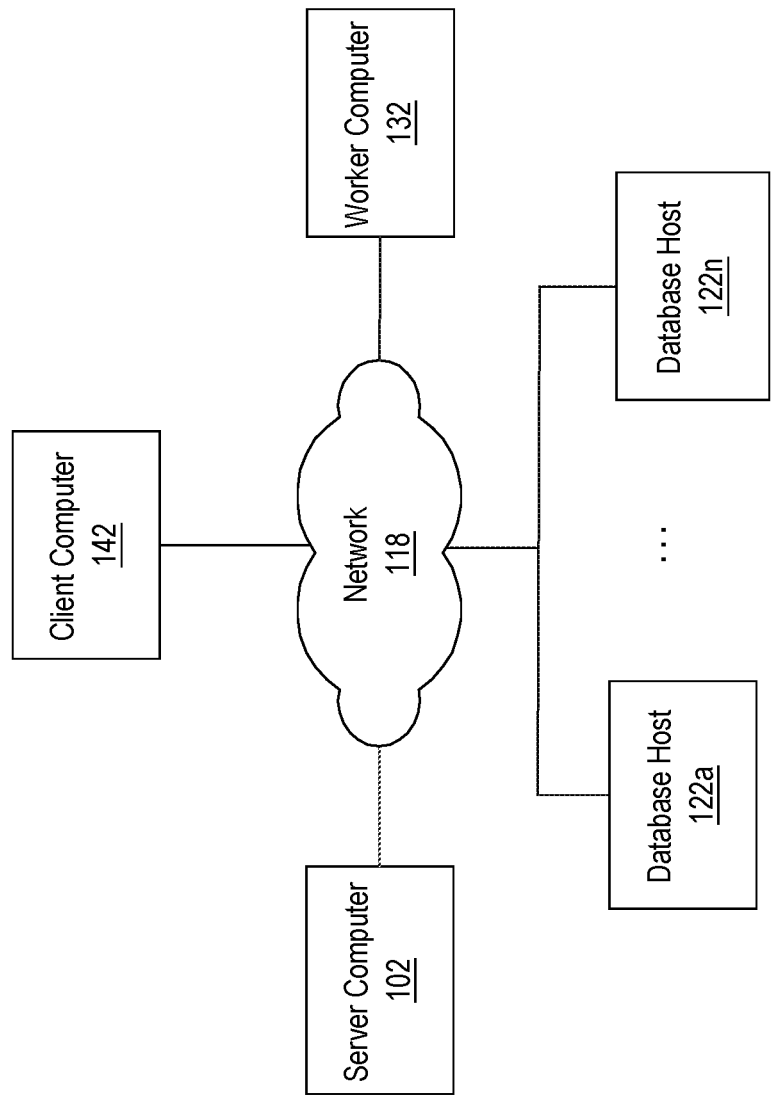
FIG. 1A illustrates example components a computer system according to the embodiments disclosed herein.

In the following description, for the purposes of explanation, numerous specific details are set forth in order to provide a thorough understanding of the present approach. It will be apparent, however, that the present approach may be practiced without these specific details. In other instances, structures and devices are shown in block diagram form in order to avoid unnecessarily obscuring the present approach.

General Overview

Techniques to efficiently assign available workers to executing multiple graph queries concurrently on a distributed graph database are disclosed. The techniques comprise a runtime engine assigning multiple workers to executing portions of multiple graph queries, each worker in each assignment asynchronously executing a portion of a graph query within a parallel-while construct that includes return statements at various locations, and the runtime engine reassigning a worker to executing another portion of the same or a different graph query to optimize the overall performance of all workers.

Executing a portion of a graph query on a distributed graph database can be performed in one or more phases. For example, such execution can be divided into two phases, where the first phase involves performing matches with graph data available in a local portion of the graph database and the second phase involves initially performing matches with graph data retrieved from a remote portion of the graph database.

The return statements are strategically placed between two consecutive phases or two consecutive steps, where a worker can reasonably halt execution after finishing at least one step. For example, each phase can be modeled as a while sub-construct, and each step can correspond to one iteration of the while sub-construct. Each return statement can be a conditional statement depending on whether a particular flag has been set by a runtime engine due to a need to reassign workers. Each return statement can also be an absolute statement such that the runtime engine is prompted to determine whether a worker should be reassigned upon the worker's automatic return.

The disclosed techniques allow reassigning workers from time to time based on the performance history of each worker, the resource requirement of each graph query, or other factors. Therefore, a worker is not idle in executing one of the graph queries, while other graph queries can be executed by more workers. Furthermore, a worker's assignment reflects where the worker is most needed.

Graph Query Execution on Graph Data

A graph database includes data representing vertices and edges of one or more graphs. A graph query specifies information regarding one or more vertices or edges to be matched with the data in the graph database. An example graph query Q is "SELECT*MATCH (a)->(b)->(c)", which searches for all 2-hop patterns in a target graph. In other words, this graph query will match any sequence of three vertices in the graph database to the specified vertices (a), (b), and (c) as long as there is an edge from the first to the second of the sequence of vertices to match the specified edge (a)->(b), and an edge from the second to the third of the sequence of vertices to match the specified edge (b)->(c), where (c) is two hops from (a). Executing a graph query on a graph database typically involves traversing the underlying graph, via a breadth-first traversal (BFT), a depth-first traversal (DFT), or a combination of both.

While the discussion below is focused on graph queries, the discussed techniques apply to other types of queries and databases, such as relational queries and relational databases including data representing objects and attributes.

Asynchronous Query Execution

Given the potentially large volume of data in the graph database, executing a graph query is often broken into individual tasks that can be executed in parallel without synchronizing with one another. Such parallel, asynchronous execution can be performed by multiple "threads" implemented by an operating system or by a computer program running on top of the operating system. In this application, "threads" and "workers" will be used interchangeably. For example, the example graph query Q discussed above can be broken into different tasks corresponding to matching (a) to different vertices in the graph database. Each thread could continue to match (b) and (c) with other vertices and (a)->(b) and (b)->(c) with appropriate edges in the graph database independent of another thread.

A thread might not be able to match the entire graph query nonstop. The thread may need to skip over a portion of the graph query, match another portion of the graph query, and revisit the skipped portion later. For example, the thread may need to skip over a portion of the graph query involving a query vertex (a vertex specified in a graph query) because the query vertex is to be matched with a data vertex (a vertex stored in a graph database) that is available not locally but in a remote portion of the graph database, as further discussed below. Similarly, the thread may need to skip over a portion of the graph query involving a query edge (an edge specified in a graph query) because the query edge is to be matched with a data edge (an edge stored in a graph database) that is available not locally but in a remote portion of the graph database. When a skip is required due to currently missing data, the thread can store the result of having matched part of the graph query as an intermediate result, send a request message to a remote server for the missing data, and continue to match another local portion of the graph query without blocking. Upon receiving the request message, the remote server may assign a remote thread to a remote state object based on the request to retrieve the missing data and continue executing the query. When the remote thread cannot proceed any further, it might similarly send request messages back to the local server or to any other remote server (if the system comprises more than two machines) that hold the vertices and the edges required to expand this intermediate result. While a request message sent to back to the local server can effectively be a response to the original request message, the request message can be treated as a new request. The response message enables the thread sending the original request or another thread running on the same machine to continue query processing based on the matching result obtained by the remote thread. It is possible that a thread has matched all possible portions of the graph query and is merely waiting for the missing data to be processed on a remote machine or for all the request messages to be sent to the remote server subject to memory requirements. In that case, the thread can be merely spinning without doing useful work, thus being underutilized.

In general, threads are managed by a runtime engine, which can create and run a thread, assign a thread to a specific task, destroy a thread, or otherwise communicate with a thread. Such thread management can be performed over a distributed environment, as further discussed below. As discussed above, any thread can be operating at any part of the graph query within and across machines, without synchronizing with another thread. On the other hand, since every thread makes independent progress, the runtime engine may not know whether any thread is doing any useful work or simply spinning and waiting for messages to arrive until the thread returns.

Nevertheless, the runtime engine can keep track of the progress of executing each graph query. In response to a request to execute a graph query, the runtime engine can split the job of executing the graph query into independent tasks, create multiple threads, and distribute at least some of the tasks to at least some of the threads. The runtime engine can determine the current progress of the job based on how many threads have returned upon completing their respective tasks, how many tasks have yet to be assigned. The runtime engine can also determine the current progress of the job based on the explicit return value of each thread that informs the thread's utilization. In some embodiments, a thread may return without having completed a task, as further discussed below. The runtime engine can have the thread continue performing the task or have another thread take over performing the task. Regardless of how the assignment of threads to tasks changes, the runtime can perform necessary bookkeeping and adjust the determination of the current progress of the job of executing the current graph query.

Query Execution on Distributed Data

As noted above, graph data can be stored in a distributed graph database across multiple machines or cluster nodes, where the portion of the distributed graph database on a machine is considered local to that machine. Therefore, when a graph query is executed by a thread, it may need to be match with graph data located across multiple machines, including those remote to the machine on which the thread is running. Information related to vertices and edges stored on a machine can be maintained in the local portion of the graph database (or a "local graph database"). In some embodiments, the local graph database can indicate not only that a vertex is stored locally but also that the vertex has a certain number of edges and which of those edges are also stored locally, and the local graph database can indicate similar information for an edge.

FIG. 1A illustrates example components of a computer system according to the embodiments disclosed herein. The computer system comprises a server computer 102, a worker computer 132, a client computer 142, and a group of database hosts 122a through 122n. These computers can be communicatively coupled with one another via one or more networks 118 or cables, wires, or other physical components.

In some embodiments, the runtime engine may run on the server computer 102 and start a thread on the worker computer 132. The runtime engine can also start another thread on the same or a different worker computer. In certain embodiments, a thread could run on the same machine as the runtime engine. A distributed graph database can include data stored on the database hosts 122a through 122n. In other embodiments, a thread can run on the same database host.

Figure 1B:
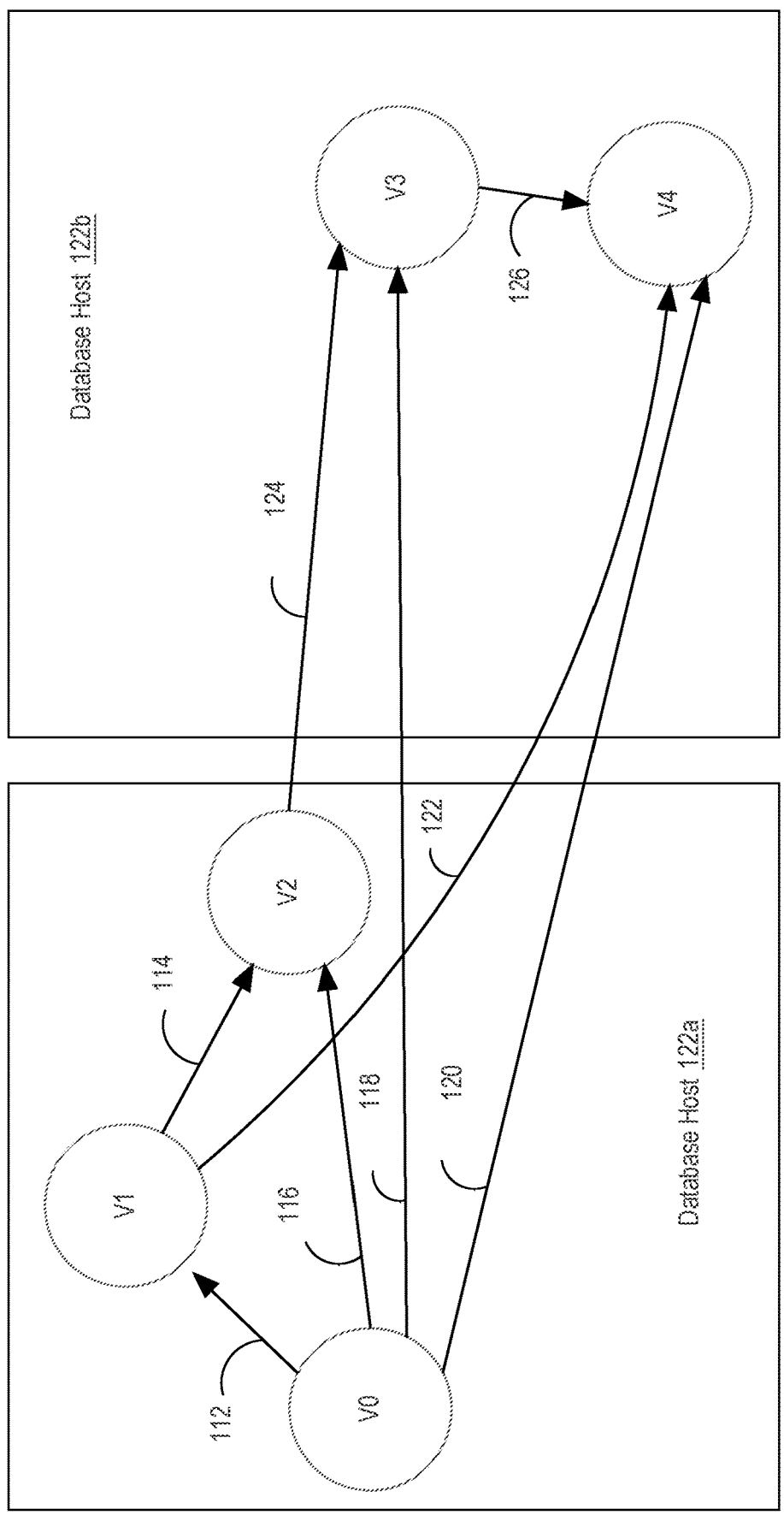
FIG. 1B illustrates an example distributed graph database.

FIG. 1B illustrates an example distributed graph database. For a thread running on the database host 122a, the vertices V0, V1, and V2 stored on the database host 122a are considered as local vertices, and the vertices V3 and V4 stored on the database host 122b are considered as remote vertices. Similarly, the edges 112, 114, and 116 stored on the database host 122a are considered as local edges and the edges 126 stored on the database host 122b is considered as a remote edge. The edges 118, 120, 122, and 124 each connecting a local vertex and a remote vertex can be considered as local edges or remote edges depending on where they are stored.

For the example graph query Q, matching (a)->(b)->(c) can then be performed locally for some vertices, such as (a matched with V0)->(b matched with V1)->(c matched with V2), but also requires remote matching, such as (a matched with v1)->(b matched with V2)-remote edge->(c matched with V3), or (a matched with V2)-remote edge->(b matched with V3)-remote edge->(c matched with V4).

A thread participating in the query execution can typically perform a "step" of a task nonstop. In some embodiments, the steps are defined below in an edge-centric manner in hybrid asynchronous graph traversals.

For example, a thread participating in the query execution can perform the following steps (A) or (B) as long as the query edges are matched with local edges:

(A) Go depth-first—match a first data vertex with (a), follow a first data edge of the first data vertex if any and match the second data vertex at the other end of the first data edge with (b), follow a second data edge of the second data vertex if any and match a third data vertex at the other end of the second data edge with (c), and produce an output.

(B) Go breadth-first—match a batch of data vertices with (a), (b), or (c) and put the produced intermediate results in a result buffer; or start from a matched data vertex (a), (b), or (c), follow all data edges of that data vertex, and put the produced intermediate results in a result buffer. In this case, the thread stops determining the current query match and stores an intermediate result in a buffer because the graph traversal requires backtracking to revisit a query vertex or edge.

The thread participating in the query execution can perform the following step (C) for remote edges or vertices: (C) Send a request message for the remote edge or vertex, which might include an intermediate result corresponding to query execution before needing the remote edge or vertex. The request message can be queued in an outgoing message buffer targeting the destination machine of that remote edge or vertex before being sent to a server of the destination machine. In this case, the thread stops determining the current query match and stores an intermediate result in a buffer because the requested graph data is missing.

The thread participating in the query execution can find next steps from incoming message buffers. The thread can also find next steps from result buffers, which hold intermediate results for BFT: Find the available buffer (if any) that corresponds to the latest parts of the graph query (e.g., buffers that exist for (c) prioritize over buffers that target (b)) and continue matching.

Further information regarding asynchronous graph traversals based on a hybrid of BFT and DFT can be found in co-pending U.S. patent application Ser. No. 16/778,668 filed on Jan. 31, 2020 and titled "Dynamic Asynchronous Traversals for Distributed Graph Queries".

Query Execution without Concurrency and Cancellation

In some embodiments, the execution of a graph query on a distributed graph database is not specifically divided into phases for each thread. Therefore, the thread can perform any possible step at any time. For example, the thread can identify a query vertex or edge, identify a data vertex or edge in the graph database, locate a data vertex or edge in a local portion of the graph database, match a query vertex or edge with a data vertex or edge, send a message to a server for a data vertex or edge in a remote portion of the graph database, receive a message from the server, or process the message to obtain data provided by the remote server. The thread can perform these steps in any logical order. For example, upon receiving a message, the thread can immediately process the message regardless of which step the thread was performing before receiving the message.

In some embodiments, the execution of a graph query on a distributed graph database is divided into two phases for each thread: a query bootstrapping phase and a query termination phase. In the query bootstrapping phase, a thread applies as much of the graph query to the graph database nonstop in the hybrid scheme or another graph traversal scheme. During this phase, the thread can always pick up some local work to perform. In the query termination phase, a thread that does not have any more local work to perform handles incoming messages to continue work. Each thread would run through the sequence of the query bootstrapping phase followed by the query termination phase to complete its assignment.

Regardless of the number of phases, one approach of asynchronously executing a first graph query on a distributed graph database is to assign a group of threads to executing the first graph query, where none of these threads will be available for executing a second graph query until execution of the first graph query is complete. Once invoking the threads, the runtime engine does not need to communicate with any of the threads until all the threads have finished all of their work. Consequently, when some of these threads are idle but no incoming messages arrive to generate useful work for the idle threads, and when a second graph query needs to be executed but not enough threads are available to execute the second graph query, inefficient resource utilization occurs.

Query Execution with Concurrency and Cancellation

In some embodiments, the runtime engine has more communication with the threads to exert more control over assigning the threads to work or no work, to enable graph query execution with concurrency and cancellation. The concurrency refers to executing multiple graph queries concurrently, where a thread can be reassigned from executing a first graph query to executing a second graph query while the execution of the first graph query is not yet complete. The cancellation refers to prematurely terminating execution of a graph query, where each thread is reassigned to no longer executing the graph query.

In some embodiments, the runtime engine can control thread execution using a parallel-while construct, where all threads run within the construct in parallel and each thread runs until the while predicate evaluates to false signaling that the thread is no longer needed. The parallel-while construct includes conditional return statements that depend on whether a yield flag is set. The yield flag can be specific to each thread or each graph query. The runtime engine can set the yield flag in response to a request to execute a new graph query or to cancel execution of an existing graph query. Upon determining that the yield flag is set, a thread returns to "yield" control to the runtime engine, which enables the runtime engine to reassign the thread based on workload needs. For example, when execution of another graph query needs more threads, the thread can be reassigned to executing that query, or when execution of the current query is being canceled, the thread is reassigned to no further work related to the current query. The runtime engine can determine whether or how to reassign a thread or even whether to create or destroy threads based on different factors, including performance information reported by a returned thread, as further discussed below. The runtime engine can unset a yield flag specific to a graph query when there is no longer a reason to reassign a thread to executing that graph query. The runtime engine can also unset the yield flag specific to a thread upon initially assigning the thread to executing a graph query.

(I) A Thread Yielding Control

In some embodiments, the conditional return statements are added at appropriate locations within the parallel-while construct. As discussed above, executing a graph query can be performed in one or more phases, and each phase can correspond to a while sub-construct. A conditional return statement can be added to each of the while sub-construct to be checked in each iteration of the while sub-construct, for example.

FIG. 2 illustrates an example parallel-while construct. This example parallel-while construct corresponds to the two phases of query bootstrapping and query termination, as discussed above. In the statement 202, a thread checks whether execution of the present query is complete. This check can be performed based on information received from the runtime engine before the thread enters the parallel-while construct, for example.

In the statement 204, the thread engages in the query bootstrapping phase, where it iteratively finds the "next" set of "distributed" data vertices to match with given query vertices and performs the matching until it needs to return. In step 206, the thread performs, for each of these distributed query vertices, "bootstrapping" by performing steps (A), (B), and (C) discussed above. In step 208, the thread checks the yield flag and returns in response to a set yield flag. The thread can return indicating whether there is more work to be done (e.g., as a result of having intermediate results that have not been used, as discussed above). When all the threads return and the termination condition of the statement 202 also returns true, the query execution is complete, and a thread entering the parallel-while construct can return from the statement 202. The thread can also return indicating its performance status, as further discussed below.

In the statement 210, and specifically in the statement 212, the thread engages in the query termination phase, where it iteratively checks the next set of incoming messages, retrieves data received from a server, and performs the matching until it needs to return. The statement 214 is similar to the statement 208. When the thread reaches the statement 214, the thread unable to further execute the graph query because query execution is complete or more likely because the required data is currently missing from the local portion of the distributed database.

The location of the return statement in the statement 208 in this example means that the thread is likely to return after executing the graph query for the set of distributed data vertices as far as it can. The thread can continue to receive another set of distributed data vertices in the statement 204 as long as the yield flag is not yet. Similarly, the location of the return statement in the statement 214 in this example means that the thread is likely to return after executing the graph query for the set of data vertices or edges retrieved from incoming messages as far as it can. The thread can continue to check new incoming messages and retrieve another set of data vertices or edges as long as the yield flag is not set. In some embodiments, the return statements can be inserted in other locations within the parallel-while construct, such as within the while sub-construct only for the query bootstrapping phase or only for the query termination phase or at the end of only the query bootstrapping phase or only the query termination phase. In other embodiments, the yield flag can be eliminated, and the return statements are no longer conditional.

Upon return, a thread can be reassigned to the same task or a different task, and the thread re-enters the parallel-while construct. Each time a thread enters the parallel-while construct, the thread does not necessarily engage in each of the phases. For example, for the currently assigned task, when all the query bootstrapping has been performed, the thread could quickly jump to the statement 210.

In some embodiments, each thread maintains a state object (denoted as tls in FIG. 2), which can include the various buffers discussed above. The thread can store in the state object an intermediate result it has generated together with necessary metadata to enable further matching of the graph query. For the example query Q, the thread may store, in a result buffer, the result of matching (a), (a)->(b), and (b) as an intermediate result E1. The thread can also store metadata indicating (a), (a)->(b), and (b) have been matched and it is (b)->(c) that needs to be matched next. Alternatively, the thread can store, in an outgoing message buffer, the result of matching (a) and (a)->(b) as an intermediate result E2 together with or as part of an outgoing message requesting a match M of (b). The thread can also store metadata indicating (a) and (a)->(b) has been matched and it is (b) that needs to be matched next. Such outgoing messages can be queued up for a batch delivery that is efficient or maybe necessary because the destination is not currently available to receive messages. In addition, the thread may store a response message containing M received from a remote server. Such incoming messages can also be queued up, where the thread does not check them all the time but only them in the query termination phase, as discussed above. Each state object can be managed by the runtime engine and transferred between threads, as further discussed below. When a first thread returns without completing the assigned task, the state object enables a second thread to complete that assigned task without interacting with the first thread.

In some embodiments, a state object can include any other information recorded by a thread that is maintaining the statement object. When the thread returns, the thread can then report specific information recorded in the associated state object. The specific information can indicate whether the currently assigned task was completed. The specific information can also include performance metrics, such as how often the thread was actively performing each assigned task vs. how often the thread was idle. The performance metrics could be computed per graph query, which can be used to determine how many threads to assign to executing a graph query as well as how many threads to maintain overall. To support the reporting of such performance metrics, the thread could store a timestamp in the state object every time it becomes active or idle. The stamp could be stored together with an identifier of the graph query being executed, unless the association between a state object and a query is already recorded elsewhere Referring back to FIGS. 1B and 2, for the example graph query Q, a first thread could be assigned to matching (a) with V0. Therefore, in the statement 204, it is given a value of {V0}. In the statement 206, the first thread could first match {(a), (b), (c)} with {V0, V1, and V2} nonstop and store this final result directly in a central repository readable by the runtime engine or in the associated state object for later reporting to the runtime engine. The first thread could then match {(a), (b)} with {V0, V2} and determine that the edge 124 or the vertex V3 is not available locally. At that point, the first thread would send a request for the missing edge or vertex and store the intermediate result in a message buffer. The thread could then match {(a)} with {V0} and determine that the edge 118 or V3 is not available locally. At that point, the thread would send a request for the edge 118. Then, in the statement 208, the first thread would check whether the yield flag is set. If the yield flag is set, the first thread would return reporting that it has incomplete computations, and the runtime engine could determine whether or how to reassign the first thread. If the yield flag is not set, the first thread proceeds in the parallel-while construct.

In the statement 210, the first thread could then check incoming messages. In this case, there would not be any incoming messages because the edge 124, the edge 118, or the vertex V3 could be matched by a remote thread on the database host 112b, and the query execution will be complete. Specifically, the remote thread could then match {(a), (b), (c)} with {V0, V2, V3} and obtain a final result. The remote thread could also match {(a), (b), (c)} with {V0, V3, V4}. Then, in the statement 214, the first thread would check whether the yield flag is set. If the yield flag is set, the first thread would return reporting that it has incomplete computations, and the runtime engine could determine whether or how to reassign the first thread. If the yield flag is not set, the first thread would keep waiting for incoming messages.

To support concurrency and cancellation, the parallel-while construct adds little storage overhead from implementing the yield flag. While additional computational overhead may flow from checking the yield flag, setting and unsetting the yield flag, and acting on a set yield flag, such overhead can well be outweighed by improved resource utilization that flows from reducing the number of idle threads and increasing the number of graph queries being executed concurrently.

(II) The Runtime Engine Reassigning a Thread

In some embodiments, the runtime engine manages threads and state objects. The runtime engine can create threads and state objects separately. The runtime engine ensures that each state object is associated with and can be accessed by at most one thread at a time. As discussed above, the runtime engine can assign each thread to executing a portion of a graph query, and it can later reassign or destroy the thread as appropriate when the thread returns in response to a set yield flag. In assigning or reassigning a thread, the runtime engine can disassociate the thread with any current state object and associates it with another state object, which can be an existing state object or a new state object.

For example, threads T1 and T2 may be respectively associated with state objects O1 and O2 for executing a graph query Q1. T1 and T2 may determine that the tasks assigned to them involve matching the first query vertex of Q1 respectively with the first data vertex and the second data vertex of the graph database from the associated state object or another communication channel with the runtime engine. At some point, T2 may be reassigned to executing another graph query Q2 even if it has not completed its current task (and thus has unfinished work in executing Q1), leaving O2 unassociated with any thread. When T1 has completed its current task, T1 might then be associated with O2 to complete the task involving matching the first query vertex of Q1 with the second data vertex of the graph database.

In some embodiments, every time a thread returns, the runtime engine can record any specific information reported by the thread or directly obtained from the associated state object and determine whether or how to reassign the thread or whether to change the total number of threads. For example, from the recorded information, the runtime engine can maintain a first current value C1 of a first statistic of how often the threads executing a first graph query are active, a second current value C2 of the first statistic of how often the threads executing a first graph query are idle (which may be easily calculated from C1), a third current value C3 of a second statistic of how often the threads executing a second graph query are active, and a fourth current value C4 of the second statistic of how often the threads executing the second graph query are idle (which may be easily calculated from C3).

As discussed above, the runtime engine can set the yield flag upon receiving a request to execute a new graph query or to cancel execution of an existing graph query. In some embodiments, the yield flag can be part of a state object associated with a thread. A yield flag specific to the first graph query could be set selectively in response to a request to execute the second graph query. It can be set when C1 is below a first threshold, C2 is above a second threshold, C3 is above a third threshold, or C4 is below a fourth threshold, or when C1, C2, C3, or C4 satisfy another predetermined relationship that indicates too many threads executing the first graph query and too few threads executing the second graph query. A yield flag specific to each thread executing the first graph query can be set selectively additionally based on the specific information recorded by the thread in a similar fashion. Upon receiving a request to cancel executing of an existing graph query, the runtime engine can set the yield flag specific to that existing graph query or the yield flag specific to every thread executing that existing graph query.

In some embodiments, the runtime engine can decide to reassign the thread from executing the first graph query to executing the second graph query similarly based on C1, C2, C3, or C4. The runtime engine can destroy the thread when the sum of C2 and C4 is above a fifth threshold, or when C1, C2, C3, or C4 satisfy another predetermined relationship that indicates too many threads executing the first graph query and the second graph query. Similarly, the runtime engine can create more threads as appropriate.

In some embodiments, the runtime engine can also decide when to unset the yield flag based on these or similar statistics and thresholds. For example, runtime engine can unset the yield flag specific to the first graph query or a thread executing the first graph query only when both C1 and C3 are below certain thresholds or C2 and C4 are above other thresholds. The runtime engine can also determine from historical data how adding a thread to executing a graph query can increase the total amount of activity and similarly how removing a thread to executing a graph query can increase the total amount of inactivity in executing the graph query. Based on the determination, the runtime engine can then unset the yield flag specific to the first graph query or stop setting the yield flags specific to each thread executing the first graph query when a certain number of threads have been reassigned from executing a first graph query to executing a second graph query.

In some embodiments, the thresholds can be compared with aggregate values of the statistics over a certain period of time instead of the current values. In some embodiments, the thresholds can be different across different graph queries. For example, the first threshold can be lower or the second threshold can be higher when the first graph query is more complex in terms of the number query vertices or edges, the estimated number of matches, the historical amount of time required for execution by a fixed number of threads, or another criterion. In some embodiments, the runtime engine can limit the number of threads assigned to executing each graph query within a certain range, which can be specific to the graph query.

Example Processes

Figure 3A:
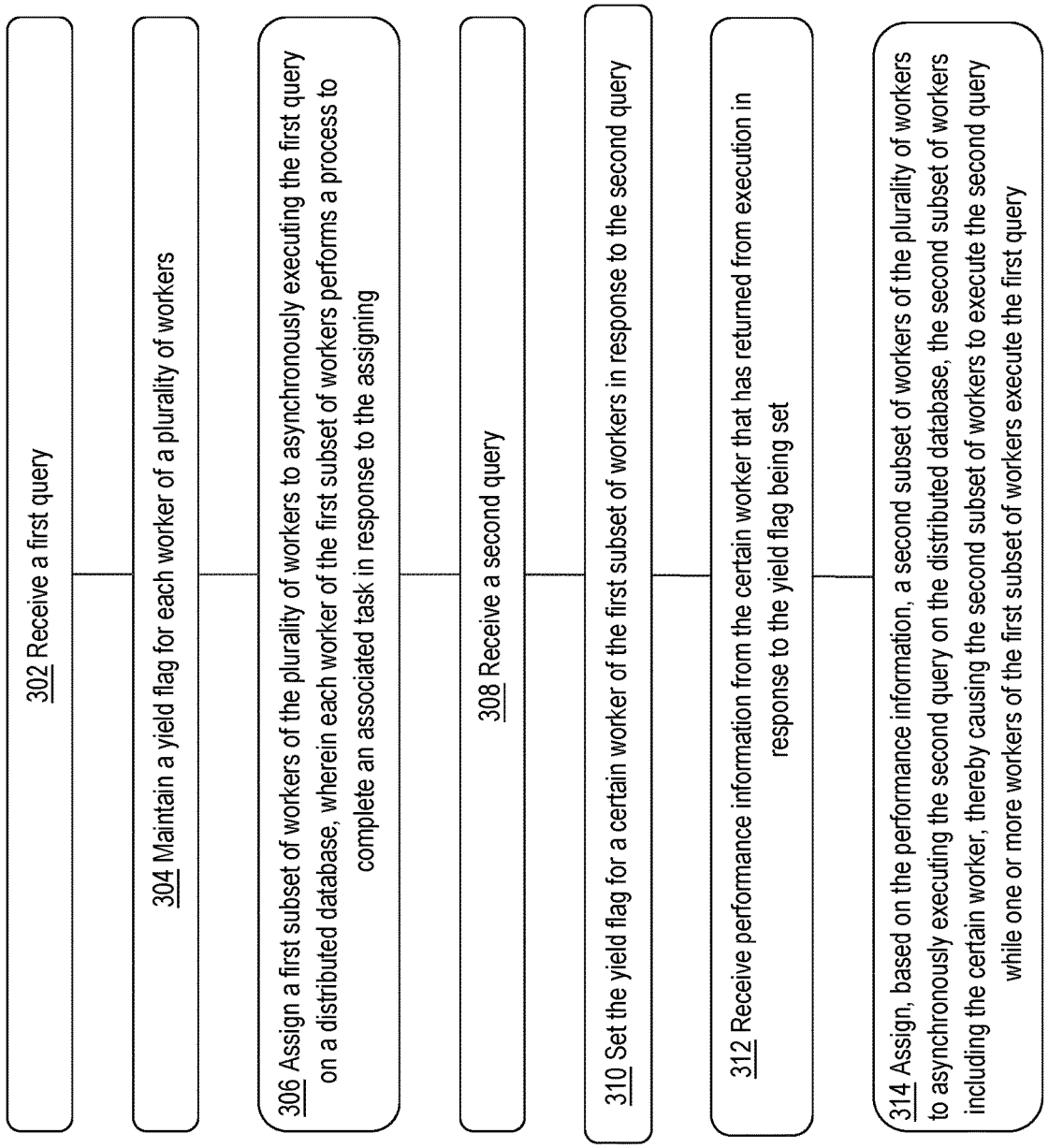
FIG. 3A illustrates a process of concurrent, asynchronous query execution in a distributed environment according to embodiments disclosed herein.
Figure 3B:
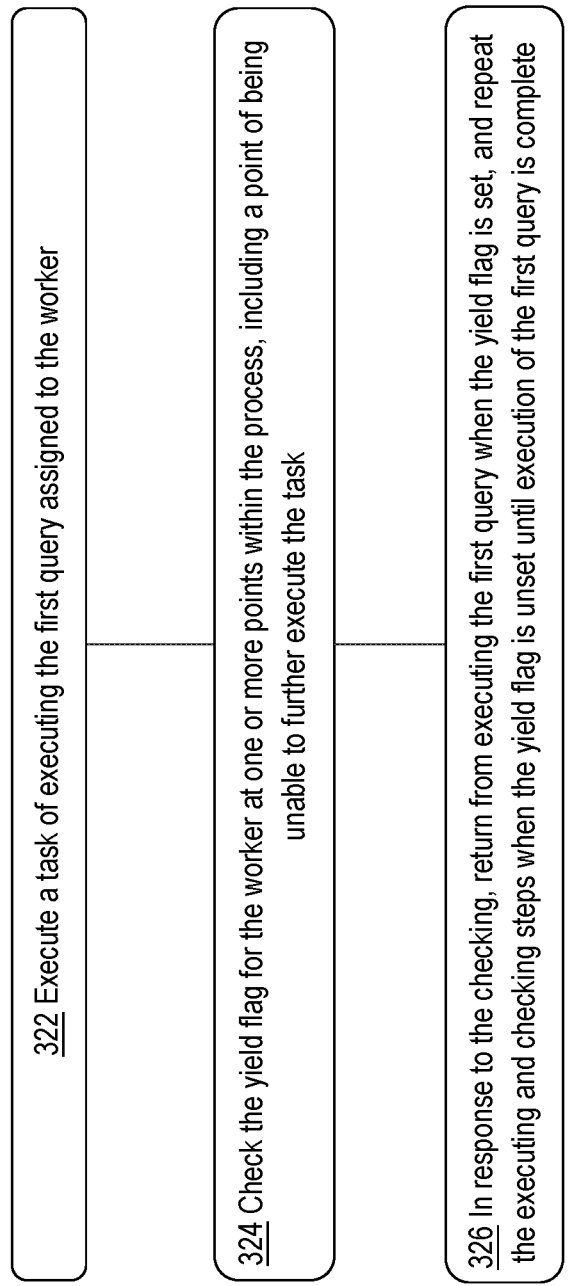
FIG. 3B illustrates another process of concurrent, asynchronous query execution in a distributed environment according to embodiments disclosed herein.

FIG. 3A and FIG. 3B each illustrate a process of concurrent, asynchronous query execution in a distributed environment according to embodiments disclosed herein. FIG. 3A and FIG. 3B are each shown in simplified, schematic format for purposes of illustrating a clear example and other embodiments may include more, fewer, or different elements connected in various manners. FIG. 3A and FIG. 3B are each intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

Referring to FIG. 3A, at block 302, a runtime engine receives a first query. In some embodiments, the first query is a graph query, and the distributed database being a graph database. In other embodiments, the first query includes a query vertex, and the task includes matching the query vertex to one or more vertices stored in the distributed database.

At block 304, the runtime engine maintains a yield flag for each worker of a plurality of workers.

At block 306, the runtime engine assigns a first subset of workers of the plurality of workers to asynchronously executing the first query on a distributed database, where each worker of the first subset of workers performs the process (in the parallel-while construct) illustrated in FIG. 3B to complete an associated task in response to the assigning.

Referring to FIG. 3B, at block 322, each worker of the first subset of workers executes a task of executing the first graph query. In some embodiments, executing the task is divided into two or more phases, and the one or more points includes a point in each phase of the two or more phases. The two or more phases can include two phases, a first phase in which the worker matches the first query with only data stored in a local portion of the distributed database, and a second phase in which the worker continues matching the first query with data stored in a remote portion of the distribute database.

At block 324, the worker checks the yield flag for the worker at one or more points within the process, including a point of being unable to further execute the task.

At block 326, the worker, in response to the checking, returns from executing the first query when the yield flag is set, and repeating the executing and checking steps when the yield flag is unset until execution of the first query is complete.

At block 308, the runtime engine receives a second query.

At block 310, the runtime engine sets the yield flag for a certain worker of the first subset of workers in response to the second query.

At block 312, the runtime engine receives performance information from the certain worker that has returned from execution in response to the yield flag being set. In some embodiments, the certain worker has returned from a point of waiting for the data stored in the remote portion of the distributed database to become available locally.

At block 314, the runtime engine assigns, based on the performance information, a second subset of workers of the plurality of workers to asynchronously executing the second query on the distributed database, the second subset of workers including the certain worker, thereby causing the second subset of workers to execute the second query while one or more workers of the first subset of workers execute the first query.

In some embodiments, in assigning the certain worker to executing the first query, the runtime engine associates the certain worker with a first distinct state object. The certain worker then updates the first distinct state object within the process. The first distinct state object indicates that the certain worker has not completed the associated task upon returning from execution. Therefore, in assigning the certain worker to executing the second graph query, the runtime engine unsets the yield flag for the certain worker, associates the certain worker with a second distinct state object instead, and associates another worker of the plurality of workers that is not currently assigned with the first distinct state object.

In some embodiments, the performance information indicates how active the certain worker has been in executing the first query based on an amount of time spent by the certain worker not waiting for data in a remote portion of the distributed database. In other embodiments, the runtime engine also receives execution status information from the certain worker in response to the yield flag being set. The execution status information indicates how much the worker has completed the associated task. The runtime engine then assigns the second subset of workers based on the execution status information and the performance information provided by every worker that has returned from execution.

In some embodiments, the runtime engine receives a request to cancel execution of the first query, sets the yield flag for every worker of the one or more workers executing the first query, and refrains from assigning any worker that has returned from execution to further executing the first query.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
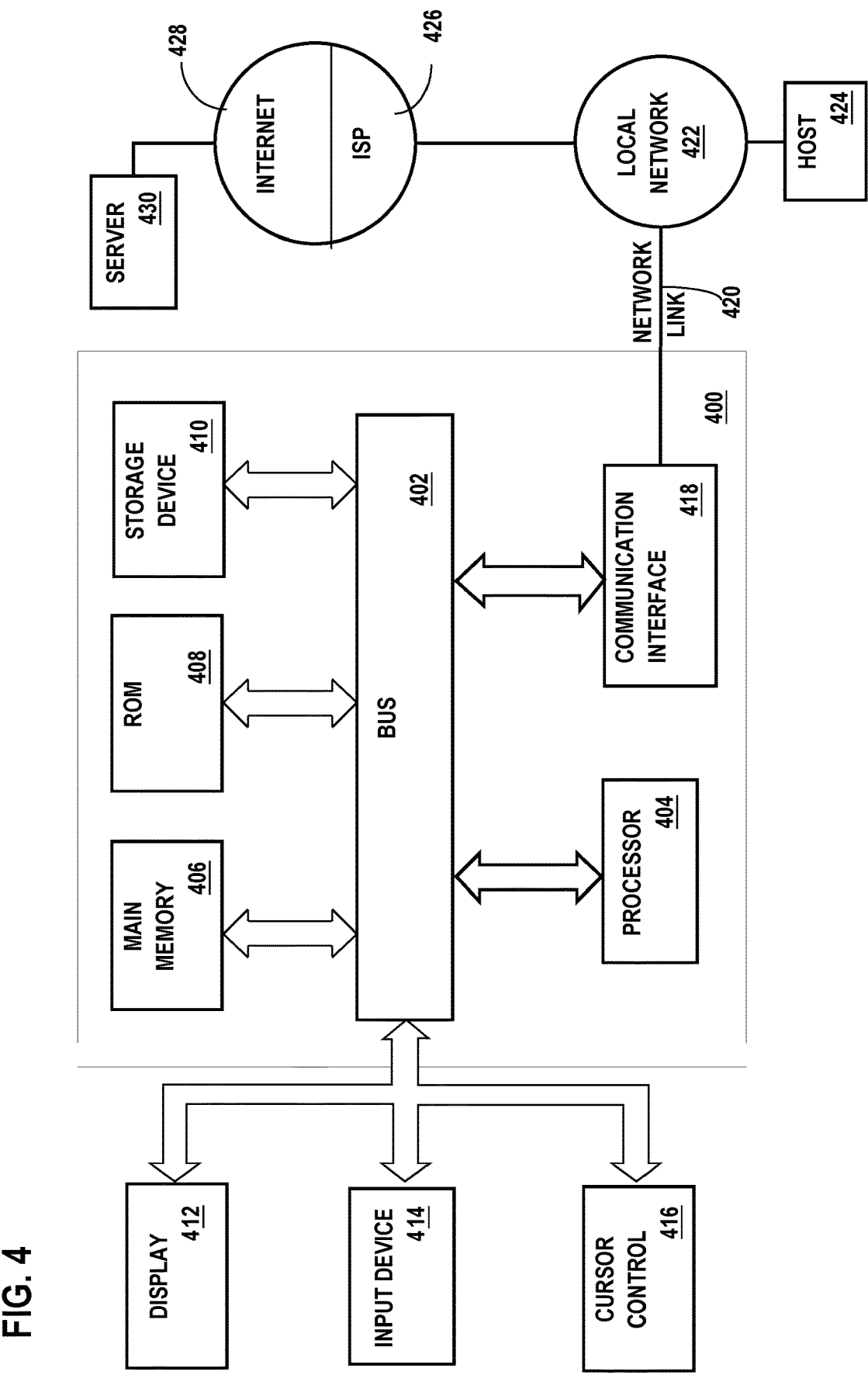
FIG. 4 is a block diagram that illustrates a computer system upon which an embodiment of the approach may be implemented.

For example, FIG. 4 is a block diagram that illustrates a computer system 400 upon which an embodiment of the approach may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Cloud Computing Overview

The techniques described herein are implemented using one or more processing solutions, examples of which include distributed systems, clustered computing systems, and cloud computing systems. In an embodiment, database management system 100 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to database management system 100, or to other entities within this description, is controllable via an interface that is exposed at a cloud computing system.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A computer-implemented method of concurrent, asynchronous query execution in a distributed environment, comprising:
   receiving a first query;
   maintaining a yield flag for each worker of a plurality of workers;
   assigning a first subset of workers of the plurality of workers to asynchronously executing the first query on a distributed database,
      wherein each worker of the first subset of workers performs a process to complete an associated task in response to the assigning, comprising:
         executing a first phase of the task comprising matching a first portion of the first query with data stored in a local portion of the distributed database,
         identifying a second portion of the first query to be matched with data that is unavailable in the local portion of the distributed database,
         executing a second phase of the task comprising matching the second portion of the first query with data stored in a remote portion of the distributed database,
         checking the yield flag for the worker at one or more points within the process, including a point of being unable to further execute the task, and
         in response to the checking, returning from executing the first query when the yield flag is set, and repeating the executing and checking steps when the yield flag is unset until execution of the first query is complete;
   receiving a second query;
   setting the yield flag for a certain worker of the first subset of workers in response to the second query;
   receiving performance information from the certain worker that has returned from execution in response to the yield flag being set;
   assigning, based on the performance information, a second subset of workers of the plurality of workers to asynchronously executing the second query on the distributed database, the second subset of workers including the certain worker, thereby causing the second subset of workers to execute the second query while one or more workers of the first subset of workers execute the first query.

2. The computer-implemented method of claim 1, the first query being a graph query, the distributed database being a graph database.

3. The computer-implemented method of claim 2, the first query including a query vertex, the task being matching the query vertex to one or more vertices stored in the distributed database.

4. The computer-implemented method of claim 1, wherein the one or more points includes a point in the first phase and a point in the second phase.

5. The computer-implemented method of claim 4, wherein the certain worker has returned from a point of waiting for the data stored in the remote portion of the distributed database to become available locally.

6. The computer-implemented method of claim 1,
   wherein assigning the first subset of workers comprises associating the certain worker with a first distinct state object,
   wherein the certain worker updates the first distinct state object within the process,
   wherein the first distinct state object indicates that the certain worker has not completed the associated task upon returning from execution,
   wherein assigning the second subset of workers comprises associating the certain worker with a second distinct state object instead, unsetting the yield flag for the certain worker, and
   associating another worker of the plurality of workers that is not currently assigned with the first distinct state object.

7. The computer-implemented method of claim 1, the performance information indicating how active the certain worker has been in executing the first query based on an amount of time spent by the certain worker not waiting for data in a remote portion of the distributed database.

8. The computer-implemented method of claim 1, further comprising:
   receiving execution status information from the certain worker in response to the yield flag being set,
   the execution status information indicating how much the worker has completed the associated task,
   assigning the second subset of workers being performed based on the execution status information and the performance information provided by every worker that has returned from execution.

9. The computer-implemented method of claim 1, further comprising:
   receiving a request to cancel execution of the first query;
   setting the yield flag for every worker of the one or more workers executing the first query;
   refraining from assigning any worker that has returned from execution to further executing the first query.

10. A non-transitory, computer-readable storage medium storing instructions which, when executed cause a processor to perform a method of concurrent, asynchronous query execution in a distributed environment, the method comprising:

receiving a first query;

maintaining a yield flag for each worker of a plurality of workers;

assigning a first subset of workers of the plurality of workers to asynchronously executing the first query on a distributed database, wherein each worker of the first subset of workers performs a process to complete an associated task in response to the assigning, comprising:

executing a first phase of the task comprising matching a first portion of the first query with data stored in a local portion of the distributed database, identifying a second portion of the first query to be matched with data that is unavailable in the local portion of the distributed database, executing a second phase of the task comprising matching the second portion of the first query with data stored in a remote portion of the distributed database, checking the yield flag for the worker at one or more points within the process, including a point of being unable to further execute the task, and in response to the checking, returning from executing the first query when the yield flag is set, and repeating the executing and checking steps when the yield flag is unset until execution of the first query is complete;

receiving a second query;

setting the yield flag for a certain worker of the first subset of workers in response to the second query;

receiving performance information from the certain worker that has returned from execution in response to the yield flag being set;

assigning, based on the performance information, a second subset of workers of the plurality of workers to asynchronously executing the second query on the distributed database, the second subset of workers including the certain worker, thereby causing the second subset of workers to execute the second query while one or more workers of the first subset of workers execute the first query.

11. The non-transitory, computer-readable storage medium of claim 10, the first query being a graph query including a query vertex, the distributed database being a graph database, the task being matching the query vertex to one or more vertices stored in the distributed database.

12. The non-transitory, computer-readable storage medium of claim 10, wherein the one or more points includes a point in the first phase and a point in the second phase.

13. The non-transitory, computer-readable storage medium of claim 12, wherein the certain worker has returned from a point of waiting for the data stored in the remote portion of the distributed database to become available locally.

14. The non-transitory, computer-readable storage medium of claim 10, wherein assigning the first subset of workers comprises associating the certain worker with a first distinct state object, wherein the certain worker updates the first distinct state object within the process, wherein the first distinct state object indicates that the certain worker has not completed the associated task upon returning from execution, wherein assigning the second subset of workers comprises associating the certain worker with a second distinct state object instead, unsetting the yield flag for the certain worker, and associating another worker of the plurality of workers that is not currently assigned with the first distinct state object.

15. The non-transitory, computer-readable storage medium of claim 10, the performance information indicating how active the certain worker has been in executing the first query based on an amount of time spent by the certain worker not waiting for data in a remote portion of the distributed database.

16. The non-transitory, computer-readable storage medium of claim 15, further comprising:

receiving execution status information from the certain worker in response to the yield flag being set, the execution status information indicating how much the worker has completed the associated task, assigning the second subset of workers being performed based on the execution status information and the performance information provided by every worker that has returned from execution.

17. The non-transitory, computer-readable storage medium of claim 10, further comprising:

receiving a request to cancel execution of the first query;

setting the yield flag for every worker of the one or more workers executing the first query;

refraining from assigning any worker that has returned from execution to further executing the first query.

18. A computer system for asynchronous query execution in a distributed environment, comprising:

a memory;

one or more processors coupled to the memory and configured for:

receiving an assignment to asynchronously executing a first query on a distributed database, the assignment being associated with a task and a state object;

performing a process having two phases to complete the task, comprising:

executing a first phase of the task comprising matching a first portion of the first query with data stored in a local portion of the distributed database, identifying a second portion of the first query to be matched with data that is unavailable in the local portion of the distributed database, executing a second phase of the task comprising matching the second portion of the first query with data stored in a remote portion of the distributed database, recording in the state object a level of activity in executing the task and a status of the task, checking a yield flag controlled by a server at one or more points within the process, including a point of being unable to further execute the task, and in response to the checking, returning from executing the first query with the state object when the yield flag is set, and repeating the executing, recording, and checking steps when the yield flag is unset until execution of the first query is complete.

19. The computer-implemented method of claim 1, wherein each worker of the first subset of workers performing the process to complete the associated task in response to the assigning further comprises:

in response to requesting the data that is unavailable in the local portion of the distributed database from the remote portion of the distributed database, matching a third portion of the first query with the data stored in the local portion of the distributed database.

20. The non-transitory, computer-readable storage medium of claim 10, wherein each worker of the first subset of workers performing the process to complete the associated task in response to the assigning further comprises:
 in response to requesting the data that is unavailable in the local portion of the distributed database from the remote portion of the distributed database, matching a third portion of the first query with the data stored in the local portion of the distributed database.

\* \* \* \* \*